US010194472B2

(12) United States Patent
Zhao et al.

(10) Patent No.: US 10,194,472 B2
(45) Date of Patent: Jan. 29, 2019

(54) GROUP COMMUNICATION METHOD, DEVICE AND SYSTEM

(71) Applicant: China Academy of Telecommunications Technology, Beijing (CN)

(72) Inventors: Yali Zhao, Beijing (CN); Ying Wang, Beijing (CN); Fangli Xu, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 106 days.

(21) Appl. No.: 15/024,452

(22) PCT Filed: Sep. 24, 2014

(86) PCT No.: PCT/CN2014/087291
§ 371 (c)(1),
(2) Date: Mar. 24, 2016

(87) PCT Pub. No.: WO2015/043470
PCT Pub. Date: Apr. 2, 2015

(65) Prior Publication Data
US 2016/0242216 A1 Aug. 18, 2016

(30) Foreign Application Priority Data

Sep. 25, 2013 (CN) .......................... 2013 1 0446644

(51) Int. Cl.
*H04W 4/08* (2009.01)
*H04W 76/11* (2018.01)
(Continued)

(52) U.S. Cl.
CPC ............. *H04W 76/11* (2018.02); *H04L 12/18* (2013.01); *H04L 12/189* (2013.01);
(Continued)

(58) Field of Classification Search
CPC ... H04L 12/18; H04L 12/1886; H04L 12/189; H04L 65/1069; H04L 65/1016;
(Continued)

(56) References Cited

U.S. PATENT DOCUMENTS 9,319,851 B2 * 4/2016 Yu ........................... H04W 4/10
2005/0076369 A1 4/2005 Cai et al.
(Continued)

FOREIGN PATENT DOCUMENTS

CN 101174966 5/2008
CN 101222685 7/2008
(Continued)

OTHER PUBLICATIONS

International Search Report for PCT/CN2014/087291 dated Dec. 30, 2014.

*Primary Examiner* — Robert J Lopata
(74) *Attorney, Agent, or Firm* — Foley and Lardner LLP

(57) ABSTRACT

Disclosed are a group communication method, device and system. An MBMS network side method comprises: receiving a session start request message sent by a mobility management device of an MBMS network; judging whether the session start request message carries a group identifier of a communication group in which a session requested by the session start request message is located; and if the session start request message carries the group identifier, forwarding the session start request message to an access network device, so that the access network device allocates an air interface identifier to the session requested by the session start request message, thereby conducting group communication. In the embodiments of the present application, a session start message transferred by an MBMS network side carries a group identifier, thus realizing group communication based on an MBMS network.

18 Claims, 8 Drawing Sheets

(51) Int. Cl.
*H04W 76/40* (2018.01)
*H04L 12/18* (2006.01)
*H04W 4/06* (2009.01)
*H04N 21/2668* (2011.01)
*H04N 21/414* (2011.01)
*H04N 21/6405* (2011.01)
*H04W 8/00* (2009.01)
*H04L 29/06* (2006.01)
*H04W 48/16* (2009.01)
*H04W 88/02* (2009.01)
*H04W 92/10* (2009.01)

(52) U.S. Cl.
CPC ...... *H04L 12/1886* (2013.01); *H04L 65/1069* (2013.01); *H04L 65/403* (2013.01); *H04L 65/4076* (2013.01); *H04L 65/80* (2013.01); *H04N 21/2668* (2013.01); *H04N 21/41407* (2013.01); *H04N 21/6405* (2013.01); *H04W 4/06* (2013.01); *H04W 4/08* (2013.01); *H04W 8/00* (2013.01); *H04W 48/16* (2013.01); *H04W 76/40* (2018.02); *H04L 65/1016* (2013.01); *H04W 88/023* (2013.01); *H04W 92/10* (2013.01)

(58) Field of Classification Search
CPC ... H04L 65/403; H04L 65/4076; H04L 65/80; H04W 48/16; H04W 4/06; H04W 4/08; H04W 76/002; H04W 76/021; H04W 88/023; H04W 8/00; H04W 92/10
USPC .......................................................... 370/312
See application file for complete search history.

(56) References Cited

U.S. PATENT DOCUMENTS

| | | | | |
|---|---|---|---|---|
| 2011/0182228 A1* | 7/2011 | Shindo | .................... | H04W 4/06 370/312 |
| 2012/0106431 A1* | 5/2012 | Wu | ........................ | H04W 4/00 370/312 |
| 2013/0044668 A1* | 2/2013 | Purnadi | ............. | H04W 36/0055 370/312 |
| 2013/0114497 A1* | 5/2013 | Zhang | ................ | H04W 72/005 370/312 |
| 2014/0286222 A1* | 9/2014 | Yu | ........................... | H04W 4/08 370/312 |
| 2015/0099555 A1* | 4/2015 | Krishnaswamy | ....... | H04W 4/70 455/509 |
| 2015/0189336 A1* | 7/2015 | Wang | ................. | H04N 21/2225 725/62 |
| 2015/0223030 A1* | 8/2015 | Gu | ........................... | H04W 4/08 370/312 |
| 2015/0230063 A1* | 8/2015 | Chandramouli | ...... | H04W 4/005 455/466 |
| 2015/0249978 A1* | 9/2015 | Lim | .................. | H04W 72/0413 370/329 |
| 2016/0057801 A1* | 2/2016 | Xia | ..................... | H04W 76/027 370/221 |
| 2016/0072665 A1* | 3/2016 | Xia | ..................... | H04L 41/0659 370/225 |
| 2016/0081094 A1* | 3/2016 | Han | ................. | H04L 25/03866 370/312 |
| 2016/0119762 A1* | 4/2016 | Zhu | ........................ | H04W 4/10 370/312 |
| 2016/0174193 A1* | 6/2016 | Zhang | ................. | H04L 61/2069 370/312 |
| 2017/0019879 A1* | 1/2017 | Shindo | ................ | H04W 72/005 |

FOREIGN PATENT DOCUMENTS

| | | |
|---|---|---|
| CN | 102123345 | 7/2011 |
| CN | 102547592 A | 7/2012 |
| CN | 102595327 | 7/2012 |
| EP | 2802163 | 11/2014 |

\* cited by examiner

GROUP COMMUNICATION METHOD, DEVICE AND SYSTEM

This application is a US National Stage of International Application No. PCT/CN2014/087291, filed on Sep. 24, 2014, designating the United States and claiming the benefit of Chinese Patent Application No. 201310446644.9, filed with the State Intellectual Property Office of People's Republic of China on Sep. 25, 2013 and entitled "Group communication method, device and system", which is hereby incorporated by reference in its entirety.

FIELD

The present invention relates to the field of wireless communications and particularly to a group communication method, device and system.

BACKGROUND

Along with the development of the Long Term Evolution (LIE) technologies, if an operator can provide a group communication function using the LIE system, then no 2/3G networks will be maintained at all due to the development of the LTE system so that the networks can transition smoothly to the LIE system. For the LTE system, an end to end delay in group communication is required to be no more than 300 ms, and in order to satisfy this required delay, the majority of the enterprises currently tend to reuse the Multimedia Broadcast Multicast Service (MBMS) architecture as a network architecture, and to make some modification to the existing MBMS network architecture so as to satisfy the required delay.

The names of primary nodes and the functions of primary interfaces in the MBMS network architecture of the LTE system will be listed below:

Logic Entities:
Mobility Management Entity (MME);
MBMS Gateway (MBMS GW);
Multi-cell/multicast Coordination Entity (MCE); and
Evolved Node B (eNB); and
Interfaces:
M3: the interface provides session management related function between the MME and the MCE, e.g., session start notification, and session stop notification;
M2: the interface provides session management, transfer of MBMS scheduling information, and other functions between the MCE and the eNB; and
M1: the interface provides MBMS service transfer between the MBMS GW and the eNB.

Although the idea of group communication based upon the MBMS network architecture has been proposed at present, there has been absent in the prior art a particular solution to group communication based upon the MBMS network architecture.

SUMMARY

An object of the invention is to provide a group communication method, device and system so as to enable group communication based upon the MBMS network architecture.

The object of the invention is attained by the following technical solutions:

A group communication method at the MBMS network side includes:

receiving a session start request message transmitted by a mobility management device of an MBMS network;

judging whether the session start request message carries a group identity of a communication group to which a session requested by the session start request message relates; and if the session start request message carries the group identity, then forwarding the session start request message to an access network device so that the access network device allocates an air interface identity for the session requested by the session start request message for group communication.

In the technical solution at the MBMS network side according to the embodiment of the invention, if the session requested by the session start request message transmitted by the MBMS network side is a group communication session, then the corresponding session start request message will carry the group identity, and the MBMS network device will forward the received session start request message to the access network device instead of generating and transmitting the message to the access network device as in the existing MBMS process flow, so as to enable group communication in the MBMS network without changing the existing MBMS network architecture.

Preferably the group identity carried in the session start request message can be deleted, and then the session start request message can be forwarded to the access network device.

Further to any one of the embodiments of the group communication method above, preferably the method further includes:

receiving, by an MBMS service center node, a group communication start request message transmitted by a group communication service server, wherein the group communication start request message carries the group identity;

transmitting, by the MBMS service center node, the session start request message carrying the group identity to an MBMS gateway; and transmitting, by the MBMS gateway, the session start request message carrying the group identity to the mobility management device.

A group communication method at the air interface side includes:

judging for a session start request message transmitted by an MBMS network device whether a session requested by the session start request message is a group communication session or an MBMS session;

if it is judged that the session is a group communication session, then allocating an air interface identity for the session;

transmitting the air interface identity to a UE; and transmitting group communication data of the session, received from a group communication service server initiating the session, to the UE.

In the technical solution at the air interface side according to the embodiment of the invention, the access network device will determine the type of the session requested by the session start request message transmitted by the MBMS network device, and allocate the corresponding air interface identity for the session if it is judged that the session is a group communication session, so as to enable group communication in the MBMS network.

Preferably judging for the session start request message transmitted by the MBMS network device whether the session requested by the session start request message is a group communication session or an MBMS session includes:

searching the session start request message for a group identity of a communication group to which the session relates; and if the session start request message carries the group identity, then judging that the session is a group communication session; otherwise, judging that the session is an MBMS session It shall be noted that the message contents of the session start request message transmitted by the MBMS network device may be different for a group communication session and an MBMS session, so whether the session is a group communication session or an MBMS session can alternatively be judged from the contents of the session start request message instead of judging the session is a group communication session or an MBMS session, dependent upon whether the message carries the group identity.

Further to any one of the embodiments of the method above, preferably the air interface identity includes at least a Group-Radio Network Temporary Identity (G-RNTI), and a logic channel identity of an MBMS transmission channel.

Furthermore the logic channel identity of the MBMS transmission channel may or may not be the same as a logic channel identity of a dedicated service channel allocated for the UE.

Further to any one of the embodiments of the method above, preferably transmitting the air interface identity to the UE includes:

broadcasting the air interface identity, an identity corresponding to a communication group to which the session relates, and a correspondence relationship between the identity corresponding to the communication group, and the air interface identity to the UE; or receiving a message transmitted by the UE to request for the air interface identity, wherein the message requesting for the air interface identity carries a temporary MBMS group identity; searching for the air interface identity corresponding to the temporary MBMS group identity; and transmitting the found air interface identity to the UE; or receiving a message transmitted by the UE to request for the air interface identity, where the message requesting for the air interface identity carries a temporary MBMS group identity; searching for the identity corresponding to the communication group corresponding to the temporary MBMS group identity, and the air interface identity corresponding to the temporary MBMS group identity; and transmitting the found identity corresponding to the communication group, the found air interface identity, and a correspondence relationship between the identity corresponding to the communication group, and the air interface identity to the UE.

It shall be noted that reference can be made to the embodiments of the methods at the MBMS network side and the air interface side for a group communication method in which the air interface side and the MBMS network side cooperate with each other, so a repeated description thereof will be omitted here.

Based upon the same inventive idea as the method, an embodiment of the invention further provides a multimedia broadcast multicast service network device including:

a session message receiving module configured to receive a session start request message transmitted by a mobility management device of an MBMS network;

a message judging module configured to judge whether the session start request message carries a group identity of a communication group to which a session requested by the session start request message relates; and a session message forwarding module configured to forward the session start request message to an access network device if the session start request message carries the group identity, so that the access network device allocates an air interface identity for the session requested by the session start request message for group communication.

The MBMS network device according to the embodiment of the invention will forward the received session start request message of the group communication session to the access network device instead of generating and transmitting the message to the access network device as in the existing MBMS process flow, so as to enable group communication in the MBMS network without changing the existing MBMS network architecture.

Preferably the session message forwarding module is configured:

if the session start request message carries the group identity, to delete the group identity carried in the session start request message, and then forward the session start request message to the access network device.

Based upon the same inventive idea as the method, an embodiment of the invention further provides another multimedia broadcast multicast service network device including a processor and a radio frequency module, wherein:

the processor is configured to receive a session start request message transmitted by a mobility management device of an MBMS network, through the radio frequency module; to judge whether the session start request message carries a group identity of a communication group to which a session requested by the session start request message relates; and if the session start request message carries the group identity, to forward the session start request message to an access network device through the radio frequency module so that the access network device allocates an air interface identity for the session requested by the session start request message for group communication.

The MBMS network device according to the embodiment of the invention will forward the received session start request message of the group communication session to the access network device instead of generating and transmitting the message to the access network device as in the existing MBMS process flow, so as to enable group communication in the MBMS network without changing the existing MBMS network architecture.

Based upon the same inventive idea as the method, an embodiment of the invention further provides an access network device including:

a session type judging module configured to judge for a session start request message transmitted by an MBMS network device whether a session requested by the session start request message is a group communication session or an MBMS session;

an air interface identity allocating module configured to allocate an air interface identity for the session if the session type judging module 801 judges that the session is a group communication session;

an identity transmitting module configured to transmit the air interface identity to a UE; and a group communication data transmitting module configured to transmit group communication data of the session, received from a group communication service server initiating the session, to the UE.

The access network device according to the embodiment of the invention will make judgment as to the type of the session requested by the session start request message transmitted by the MBMS network device, and if it is judged that the session is a group communication session, then the access network device will allocate the corresponding air interface identity for the session, and further enable group communication in the MBMS network.

Preferably the session type judging module is configured:

to search the session start request message for a group identity of a communication group to which the session relates; and if the session start request message carries the group identity, to judge that the session is a group communication session; otherwise, to judge that the session is an MBMS session; or the session type judging module is configured:

to judge from the contents of the session start request message whether the session requested by the session start request message is a group communication session or an MBMS session.

Further to any one of the embodiments of the access network device above, preferably the air interface identity includes at least a Group-Radio Network Temporary Identity (G-RNTI), and a logic channel identity of an MBMS transmission channel.

Furthermore the logic channel identity of the MBMS transmission channel is the same as or different from a logic channel identity of a dedicated service channel allocated for the UE.

Further to any one of the embodiments of the access network device above, preferably the identity information transmitting module is configured:

to broadcast an identity corresponding to a communication group to which the session relates, the air interface identity, and a correspondence relationship between the identity corresponding to the communication group, and the air interface identity to the UE; or to receive a message transmitted by the UE to request for the air interface identity, wherein the message requesting for the air interface identity carries a temporary MBMS group identity; to search for the air interface identity corresponding to the temporary MBMS group identity; and to transmit the found air interface identity to the UE; or to receive a message transmitted by the UE to request for the air interface identity, wherein the message requesting for the air interface identity carries a temporary MBMS group identity; to search for the identity corresponding to the communication group corresponding to the temporary MBMS group identity, and the air interface identity corresponding to the temporary MBMS group identity; and to transmit the found identity corresponding to the communication group, the found air interface identity, and a correspondence relationship between the identity corresponding to the communication group, and the air interface identity to the UE.

Based upon the same inventive idea as the method, an embodiment of the invention further provides another access network device including a processor and a radio frequency module, wherein:

the processor is configured to judge for a session start request message transmitted by an MBMS network device whether a session requested by the session start request message is a group communication session or an MBMS session; if it is judged that the session is a group communication session, to allocate an air interface identity; to transmit the air interface identity to a UE through the radio frequency module; and to transmit group communication data of the session, received from a group communication service server initiating the session, to the UE through the radio frequency module.

The access network device according to the embodiment of the invention will make judgment as to the type of the session requested by the session start request message transmitted by the MBMS network device, and if it is judged that the session is a group communication session, then the access network device will allocate the corresponding air interface identity for the session, and further enable group communication in the MBMS network.

Based upon the same inventive idea as the method, an embodiment of the invention further provides a group communication system including:

a mobility management device of an MBMS network, an MBMS network device, and an access network device, wherein:

the mobility management device of the MBMS network is configured to transmit a session start request message to the MBMS network device;

the MBMS network device is configured to judge whether the session start request message carries a group identity of a communication group to which a session requested by the session start request message relates; and if the session start request message carries the group identity, to forward the session start request message to the access network device; and the access network device is configured to judge for the session start request message transmitted by the MBMS network device whether the session requested by the session start request message is a group communication session or an MBMS session; if it is judged that the session is a group communication session, to allocate an air interface identity for the session; to transmit the air interface identity to the UE; and to transmit group communication data of the session, received from a group communication service server initiating the session, to the UE.

In the system according to the embodiment of the invention, if the session requested by the session start request message transmitted by the MBMS network side is a group communication session, then the corresponding session start request message will carry the group identity, and the MBMS network device according to the embodiment of the invention will forward the received session start request message to the access network device instead of generating and transmitting the message to the access network device as in the existing MBMS process flow; and the access network device will make judgment as to the type of the session requested by the session start request message transmitted by the MBMS network device, and if it is judged that the session is a group communication session, then the access network device will allocate the corresponding air interface identity for the session. Group communication can be enabled in the MBMS network without changing the existing MBMS network architecture.

Preferably the system according to the embodiment of the invention further includes a group communication service server, an MBMS service center node, and an MBMS gateway, wherein:

the group communication service server is configured to transmit a group communication start request message carrying the group identity to the MBMS service center node;

the MBMS service center node is configured to transmit the session start request message carrying the group identity to the MBMS gateway upon reception of the group communication start request message; and the MBMS gateway is configured to transmit the session start request message carrying the group identity to the mobility management device upon reception of the session start request message transmitted by the MBMS service center node.

DETAILED DESCRIPTION OF THE EMBODIMENTS

The embodiments of the invention propose the solutions to group communication based upon the MBMS network architecture. The technical solutions according to the embodiments of the invention will be described below in details with reference to the drawings.

Figure 1:
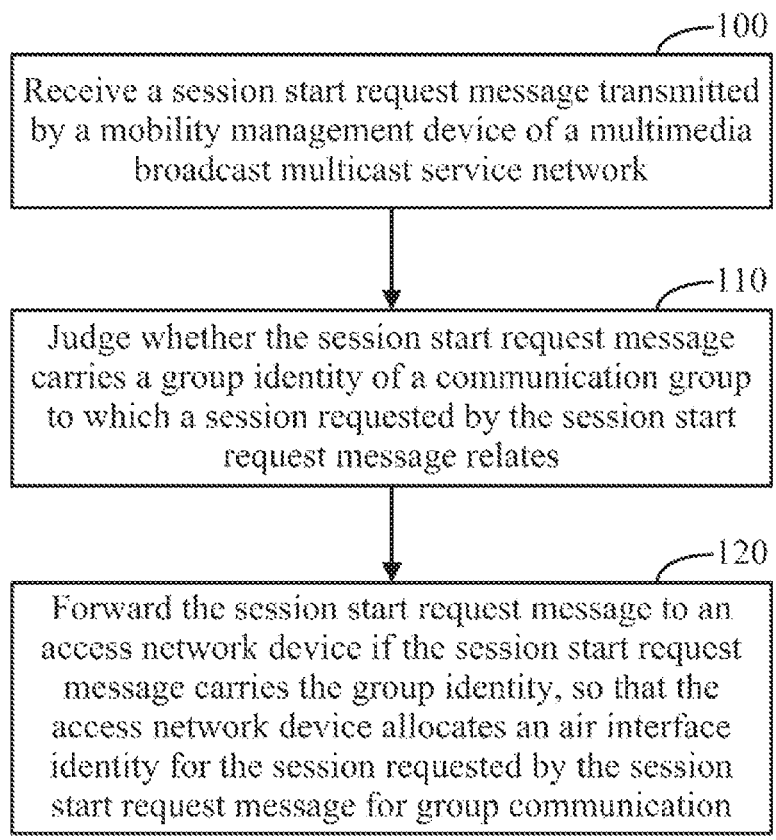
FIG. 1 is a flow chart of a first method according to an embodiment of the invention.

Firstly a group communication method at the MBMS network side in the MBMS network architecture will be described. FIG. 1 illustrates a group communication method at the MBMS network side according to an embodiment of the invention, which particularly the following operations:

The step 100 is to receive a session start request message transmitted by a mobility management device in an MBMS network.

The mobility management device in the MBMS network can include but will not be limited to an MME in an MBMS network architecture.

The step 110 is to judge Whether the session start request message carries a group identity of a communication group to which a session requested by the session start request message relates.

The step 120 is to forward the session start request message to an access network device if the session start request message carries the group identity, so that the access network device allocates an air interface identity for the session requested by the session start request message for group communication.

The process above is particularly performed by an MEMB network device communicating with the access network device, e.g., a Multi-cell/multicast Coordination Entity (MCE).

In the technical solution at the MBMS network side according to the embodiment of the invention, if the session requested by the session start request message transmitted from the MBMS network side is a group communication session, then the corresponding session start request message carries the group identity, and the MBMS network device will forward the received session start request message to the access network device, instead of generating and transmitting the message to the access network device as in the existing MBMS process flow, so as to enable group communication in the MBMS network without changing the existing MBMS network architecture.

Preferably the session start request message can be forwarded to the access network device particularly by retaining the group identity carried in the session start request message, and directly forwarding the session start request message to the access network device; or by deleting the group identity carried in the session start request message, and then forwarding the session start request message to the access network device.

Further to any one of the embodiments of the method at the MBMS network side above, preferably the method further includes:

An MBMS service center node receives a group communication start request message transmitted from a group communication service server, where the group communication start request message carries the group identity;

The MBMS service center node transmits the session start request message carrying the group identity to an MBMS gateway; and The MBMS gateway transmits the session start request message carrying the group identity to the mobility management device.

In the existing network architecture, the MBMS service center node can be a Broadcast/Multicast Service Center (BM-SC), Along with the development of the technologies, the MBMS service center node may alternatively be another logic entity or a physical node.

Figure 2:
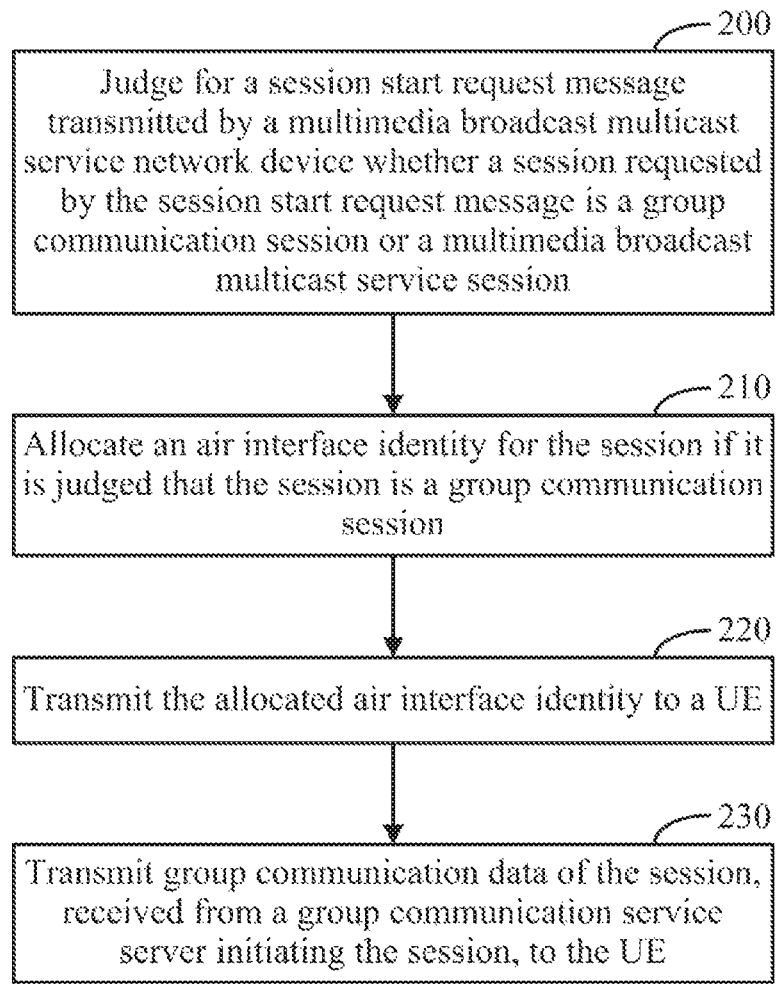
FIG. 2 is a flow chart of a second method according to an embodiment of the invention.

Next a group communication method at the air interface side in the MBMS network architecture will be described. FIG. 2 illustrates a group communication method at the air interface side according to an embodiment of the invention, which particularly includes the following operations:

The step 200 is to judge for a session start request message transmitted from an MBMS network device whether a session requested by the session start request message is a group communication session or an MBMS session.

The MBMS network device refers to a network device communicating with an access network device in the MBMS architecture, e.g., an MCE.

The step 210 is to allocate an air interface identity for the session if it is judged that the session is a group communication session.

The step 220 is to transmit the allocated air interface identity to a UE.

The step 230 is to transmit group communication data of the session, received from a group communication service server initiating the session, to the UE.

The process above is performed by the access network device. In an embodiment of the invention, the access network device can be an eNB, an NB, a relay device, etc. For example, the access network device particularly refers to an eNB in LTE network; and the access network device particularly refers to an NB in a USTM network.

In the technical solution at the air interface side according to the embodiment of the invention, the access network device determines the type of the session requested by the session start request message transmitted from the MBMS network device, and allocate the corresponding air interface identity for the session if it is judged that the session is a group communication session, so as to enable group communication in the MBMS network.

Particular implementations of the respective steps will be exemplified below respectively, and it shall be noted that embodiments derived from combinations of the particular implementations of the respective steps will also fall into the scope of the invention, but the scope of the invention will not be limited to the combinations of the particular implementations of the steps exemplified below.

Implementations of the step 200 can include but will not be limited to the following two implementations.

In a first implementation, the session start request message is searched for the group identity of the communication group to which the session relates; and if the session start request message carries the group identity, then it is judged that the session is a group communication session; otherwise, it is judged that the session is an MBMS session.

In this implementation, upon reception of the session start request message requesting for starting the group communication session, the MBMS network device retains the group identity of the communication group to which the session relates, carried in the message, and directly forwards the message to the access network device.

In a second implementation, if the session is a group communication session, then the MBMS device directly forwards the received session start request message to the access network device, and if the session is an MBMS session, then the MBMS device generates the session start request message as in the MBMS session process flow. The contents of the session start request message are different for the two types of the sessions, so it can alternatively be judged whether the corresponding session is a group communication session or an MBMS session, according to the contents of the session start request message. For example, if it is found that the session start request message carries MBMS transmission scheduling information, then the corresponding session may be determined as an MBMS session; otherwise, the session may be determined as a group communication session. Particular fields in the contents of the message, from which the type of the session is identified, can be prescribed in a protocol, or can be prescribed in the implementation.

In this implementation, upon reception of the session start request message requesting for starting the group communication session, the MBMS network device deletes the group identity of the communication group to which the session relates, carried in the message, and then forwards the message to the access network device.

In the step 210, the air interface identity allocated for the session includes at least a Group-Radio Network Temporary Identity (G-RNTI), and a logic channel identity of an MBMS transmission channel.

The G-RNTI is configured to scramble during group scheduling a Physical Downlink Control Channel for group scheduling.

The logic channel identity of the MBMS Transmission Channel (MTCH) is configured to identify a logic channel of the MBMS transmission channel.

In an embodiment of the invention, the logic channel identity of the MBMS transmission channel may or may not be the same as a logic channel identity of a Dedicated Traffic Channel (DTCH) allocated for the UE.

Moreover if media types are not distinguished from each other in the group, then only one air interface identity is allocated for the session. If media types are distinguished from each other in the group, then an air interface identity is allocated for each type of media in the communication group to which the session relates.

Particular implementations of the step 220 can include but will not be limited to the following three implementations:

In a first implementation, the allocated air interface identity, the identity corresponding to the communication group to which the session relates, and a correspondence relationship between the identity corresponding to the communication identity and the air interface identity are broadcast to the UE.

Particularly if types of media are not distinguished from each other in the group, then one communication group corresponds to one Temporary MBMS Group Identity (TMGI), where the identity corresponding to the communication group can be a TMGI corresponding to the communication group, or the group identity of the communication group, or a combination thereof if types of media are distinguished from each other in the group, then each type of media in the communication group corresponds to one TMGI, where the identity corresponding to the communication group can be the TMGI corresponding to at least one type of media, or a combination of the TMGI corresponding to the at least one type of media and the group identity; and correspondingly the TMGI corresponding to each type of media (or the TMGI and the group identity), an air interface identity corresponding to each type of media, and a correspondence relationship between the TMGI (or the TMGI and the group identity) and the air interface identity are broadcast to the UE.

In a second implementation, a message transmitted from the UE, requesting for the air interface identity is received, where the message requesting for the air interface identity carries a TMGI; the air interface identity corresponding to the communication group corresponding to the TMGI is searched for; and the found air interface identity is transmitted to the UE.

In a third implementation, a message transmitted from the UE, requesting for the air interface identity is received, where the message requesting for the air interface identity carries a TMGI; the identity corresponding to the communication group corresponding to the TMGI, and the air interface identity corresponding to the TMGI are searched for; and the found identity corresponding to the communication group, the found air interface identity, and a correspondence relationship between the identity corresponding to the communication group, and the air interface identity are transmitted to the UE.

Particularly if media types are not distinguished from each other in the group, then one communication group corresponds to a TMGI, where the identity corresponding to the communication group can be a TMGI corresponding to the communication group, or the group identity of the communication group, or a combination thereof. If types of media are distinguished from each other in the group, then respective types of media in the communication group correspond to respective TMGIs, where the identity corresponding to the communication group can be the TMGI corresponding to at least one type of media, or a combination of the TMGI corresponding to the at least one type of media, and the group identity.

If the group communication data are transmitted through group scheduling, then the step 230 can be performed particularly by transmitting group scheduling signaling in a PDCCH, scrambling the PDCCH of the group scheduling signaling using the allocated G-RNTI and transmitting the group communication data of the session to the UE at time-frequency resource positions indicated in the group scheduling signaling The technical solutions according to the embodiments of the invention will be described below in connection with particular application scenarios by way of an example in which the air interface side d the MBMS network side cooperate with each other.

Figure 3:
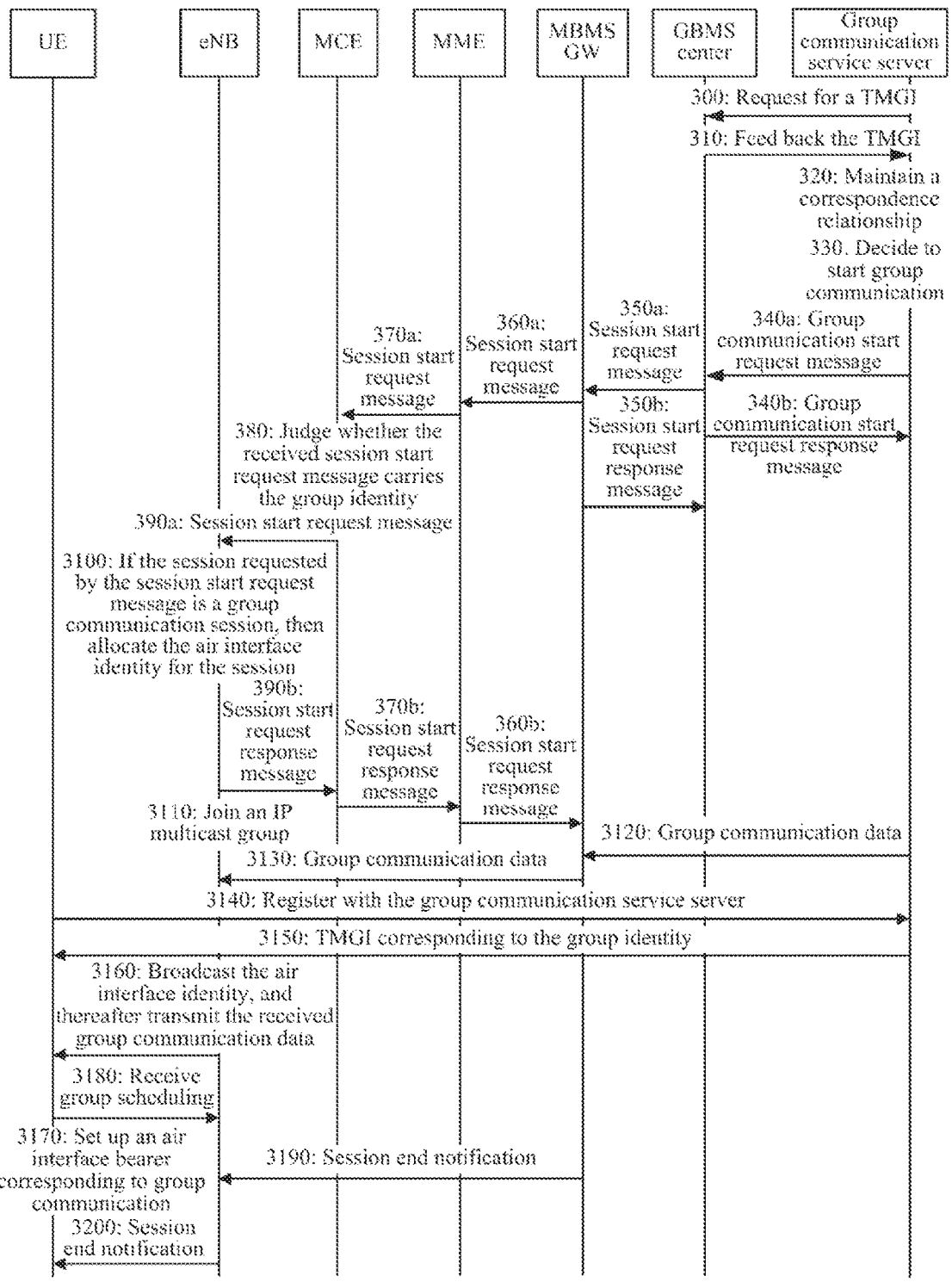
FIG. 3 is a first method signaling diagram according to an embodiment of the invention.

If types of media are not distinguished in the group (that is, the communication group corresponds to a TMGI), then the UE will receive the air interface identity which is broadcast. FIG. 3 illustrates a corresponding implementation of group communication, which particularly includes the following steps:

In the step 300, the group communication service server requests the BM-SC for the TMGI corresponding to the group identity of the communication group, where the request message carries the group identity of the communication group.

In the step 310, the BM-SC feeds the TMGI corresponding to the group identity of the communication group back to the group communication service server.

In the step 320, the group communication service server maintains the correspondence relationship between the TMGI and the group identity.

Maintenance refers to addition, modification, and deletion of the correspondence relationship between the TMGI and the group identity, or another operation. For examples, after the TMGI fed back by the BM-SC is received, if it is found that the correspondence relationship between the TMGI and the group identity is not stored locally, then the corresponding correspondence relationship may be added. If it is found that the correspondence relationship between the TMGI and the group identity is changed, then the original correspondence relationship may be modified.

In the step 330, the group communication service server decides to start group communication.

In the steps 340a and 340b, the group communication service server and the BM-SC exchange the group communication start request message and a session start request response message with each other.

The group communication start request message can carry group identity or the TMGI.

In the steps 350a and 350b, the BM-SC and the MBMS GW exchange the session start request message and the session start request response message with each other, where the session start request message carries the group identity.

In the steps 360a and 360b, the MBMS GW and the MME exchange the session start request message and the session start request response message with each other, where the session start request message carries the group identity.

In the steps 370a and 370b, the MME and the MCE exchange the session start request message and the session start request response message with each other.

The session start request message carries the group identity.

In the step 380, the MCE judges whether the received session start request message carries the group identity.

If the session start request message carries the group identity, then the session isn't handled.

If the session start request message carries the group identity, then the NICE proceeds as in the normal MBMS process flow, for example, the MCE determines MBMS transmission scheduling information.

In the steps 390a and 390b, the NICE and the eNB exchange the session start request message and the session start request response message with each other.

The content carried in the session start request message is dependent of the result of judgment in the step 380, and if the session start request message received by the MCE carries the group identity, then the NICE can directly forward the session start request message received from the MME, to the eNB, or can remove the group identity from the message, and then further forward the message to the eNB.

If the session start request message received by the MCE does not carry the group identity, then the session start request message transmitted by the MCE may be a session start request message in the normal process flow of the MBMS.

In the step 3100, the eNB judges for the session start request message received from the MCE whether the session requested by the session start request message is a group communication session or an MBMS session, and if the session is a group communication session, then the eNB allocates the air interface identity for the session.

Particularly if the NICE does not delete the group identity in the message, then the eNB can judge whether the corresponding session is a group communication session, dependent upon whether the received message carries the group identity. If the MCE deletes the group identity in the message, then the eNB can judge whether the corresponding session is a group communication session, dependent upon the content of the received message.

The air interface identity includes at least the G-RNTI, and the Logic Channel identity (LCID) of the MBMS service channel.

In an embodiment of the invention, the UE is allowed to detect a plurality of G-RNTIs concurrently, so the LCID of the DTCH can be multiplexed as the LCID of the MBMS service channel, that is, the LICI of the MBMS service channel can be the same as the LCID of the DTCH.

Of course, the LCID of the MBMS service channel can alternatively be defined different from the LCID of the DTCH.

In the step 3110 to the step 3130, the eNB joins in an IP multi-cast group, and receives group communication data from the group communication service server.

In the step 3140 and the step 3150, the UE in the group is registered with the group communication service server, and obtains the TMGI corresponding to the group identity.

If the UE in the group is going to participate in group communication, then the UE firstly reports the identity of the group to which the UE belongs, to the group communication service server during service layer interaction, and the group communication service server feeds the TMGI corresponding to the group identity back to the UE.

The group identity can be preconfigured for the UE.

In the step 3160, the eNB broadcasts the TMGI and the corresponding air interface identity, and thereafter can transmit the received group communication data to the UE.

If the eNB can obtain the group identity from the session start request message transmitted by the MCE, in the step 390a, then the eNB can also broadcast the group identity and the corresponding air interface identity, or broadcast the TMGI, the group identity, and the corresponding air interface identity.

If the LCID of the MBMS transmission channel is the same as the LCID of the DTCH, when the eNB switches the group communication data transmission mode from group scheduling to uni-cast scheduling dependent upon the number of interesting UEs, the eNB configures newly the UE with a new DRB via RRC signaling, and allocates an LCID for use in uni-cast.

If the LCID of the MBMS transmission channel is different from the LCID of the DTCH when the eNB switches the group communication data transmission mode from group scheduling to uni-cast scheduling dependent upon the number of interesting UEs, the eNB does not reconfigure any DRB, but can directly schedule using the RNTI specific to the UE (e.g., the C-RNTI), where an MAC PDU can be multiplexed for the group communication data and other uni-cast data.

In the step 3170, the UE sets up an air interface bearer corresponding to group communication.

In the step 3180, the UE starts to receive group scheduling, that is, the UE detects a PDCCH scrambled by the G-RNTI, and receives the group communication data as instructed by group scheduling.

In the step 3190, the eNB is notified of the end of the session, and the eNB instructs the UE via a broadcast or dedicated signaling to stop detecting a PDCCH scrambled by the G-RNTI.

In an embodiment of the invention, the eNB transmits the group communication data to the UE particularly through group scheduling.

Group scheduling explicitly refers to scheduling of the same group of UEs. Typically group scheduling signaling is transmitted in a PDCCH, and the PDCCH is scrambled by the G-RNTI. Upon receiving the PDCCH scrambled by the G-RNTI, the UE can determine that the scheduling signaling relates to group scheduling, and the UE belonging to the group can receive group scheduling data at a specified position indicated by the PDCCH scrambled by the G-RNTI.

Moreover in order to enable group communication through group scheduling, mapping by the eNB side of downlink logic channel of an MBMS Transmission Channel (MTCH) to a transmission channel is different from that in the MBMS. In the MBMS scheme, the MTCH is mapped to an MBMS Channel (MCH), and in order to support group scheduling, the eNB shall map the MTCH to a Downlink-Shared Channel (DL-SCH).

In order to guarantee the quality of communication in group scheduling, the same TB or different redundancy versions of the same TB can be transmitted consecutively a number N of times in group scheduling, where the number of times that the TB or the redundancy versions thereof are transmitted consecutively can be prescribed between the UE and the eNB, or can be notified by the eNB to the UE via a broadcast or dedicated signaling while configuring the air interface identity.

Figure 4:
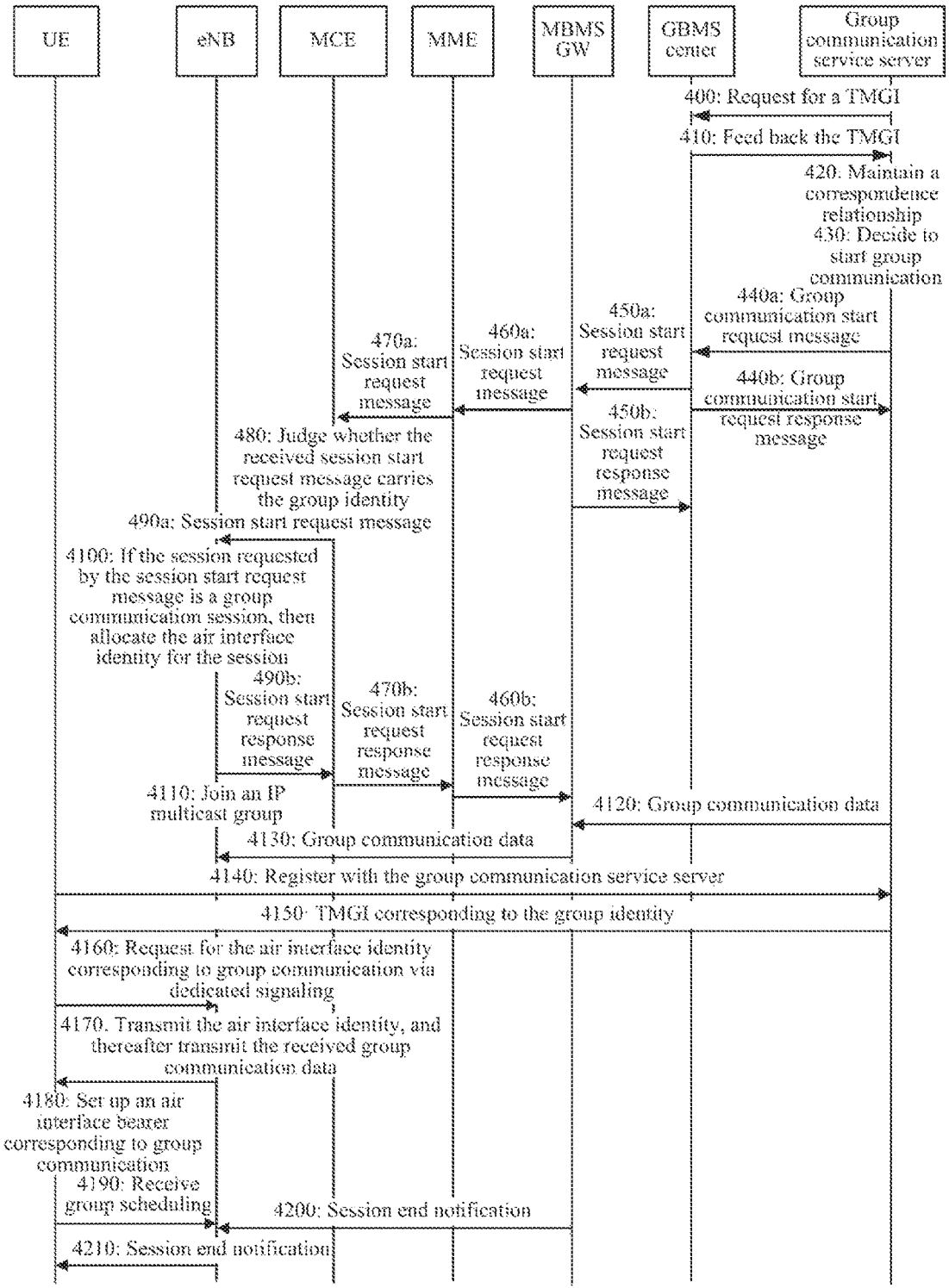
FIG. 4 is a second method signaling diagram according to an embodiment of the invention.

If types of media in the group are not distinguished from each other (that is, one communication group corresponds to one TMGI), then the UE receives the air interface identity via dedicated signaling. FIG. 4 illustrates a corresponding implementation of group communication.

The process flow illustrated in FIG. 4 is different from that illustrated in FIG. 3 primarily in the following operations:

In the step 4160, the UE requests the eNB via dedicated signaling for the air interface identity corresponding to group communication, where the dedicated signaling carries the TMGI. If the eNB can obtain the group identity in the step 490a, then the UE can alternatively transmit the dedicated signaling carrying the group identity or a combination of the group identity and the TMGI.

In the step 4170, the eNB transmits the air interface identity corresponding to group communication to the UE via dedicated signaling.

For example, the eNB transmits the air interface identity corresponding to the TMGI to the UE via dedicated signaling, or transmits the air interface identity corresponding to the group identity to the UE via dedicated signaling, or transmits the air interface identity corresponding to the TMGI and the group identity to the UE via dedicated signaling.

Figure 5:
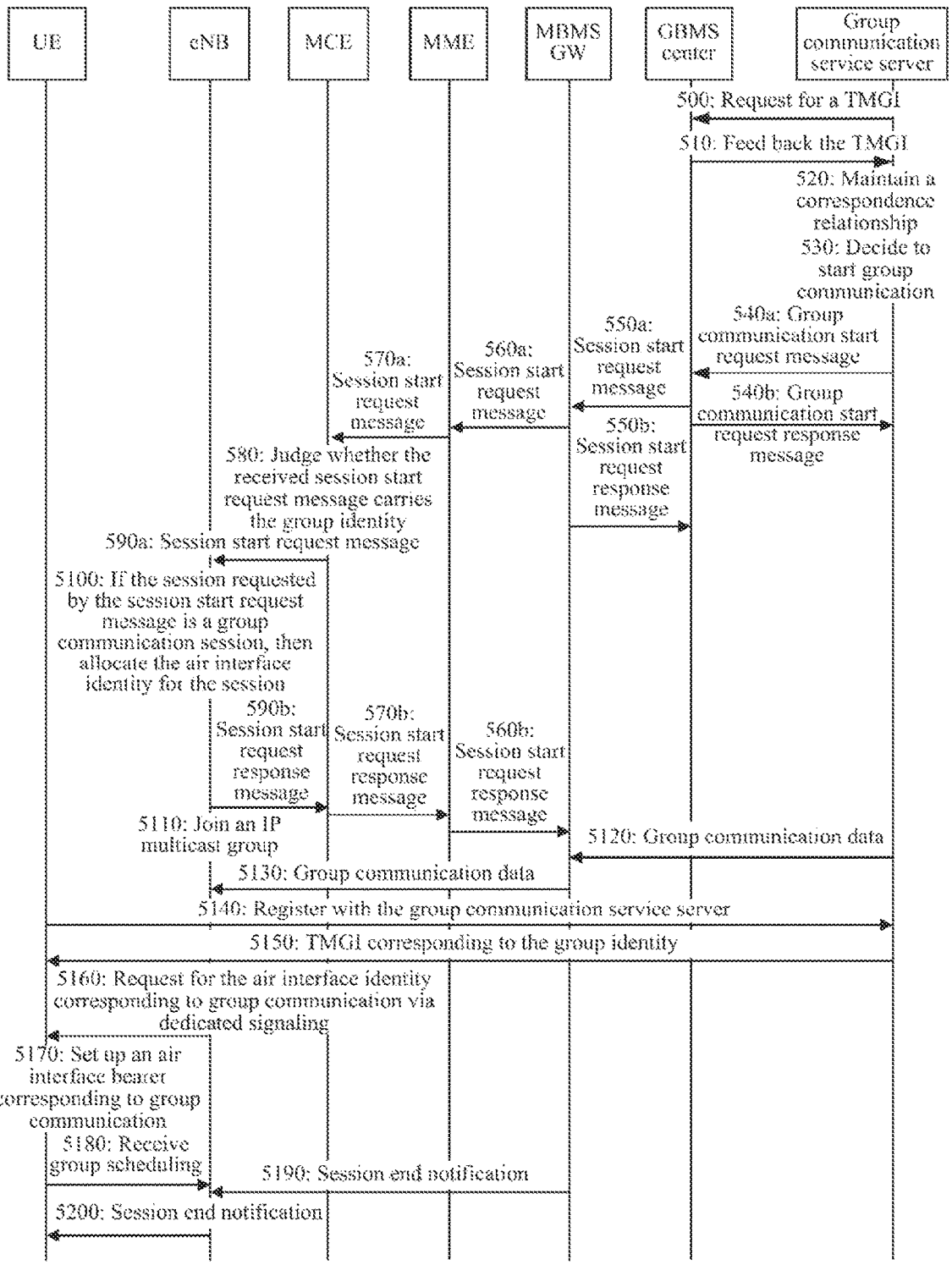
FIG. 5 is a third method signaling diagram according to an embodiment of the invention.

If types of media in the group are distinguished from each other (that is, each type of media in the group corresponds to a TMGI, then the UE receives the air interface via a broadcast. FIG. 5 illustrates a corresponding implementation of group communication.

The process flow illustrated in FIG. 5 is different from that illustrated in FIG. 3 primarily in the following operations:

In the step 500, the group communication service server requests the BM-SC for the TMGI corresponding to each type of media in group communication.

In the step 510, the BM-SC feeds the TMGI corresponding to each type of media back to the group communication service server.

In the step 5100, the eNB judges from the information carried in the session start request message received from the MCE whether the session requested by the session start request message is a group communication session or an MBMS session, and if the session is a group communication session, then the eNB allocates the air interface identity for the session.

The eNB allocates an air interface identity for each type of media in the communication group to which the session relates.

In the steps 5140 and 5150, the UE in the group is registered with the group communication service server, where the UE being registered indicates to the group communication service server the identity of the group and the types of media interesting to the UE. The group communication service server notifies the UE of the TMGIs corresponding to the interesting types of media in the group interesting to the UE.

Figure 6:
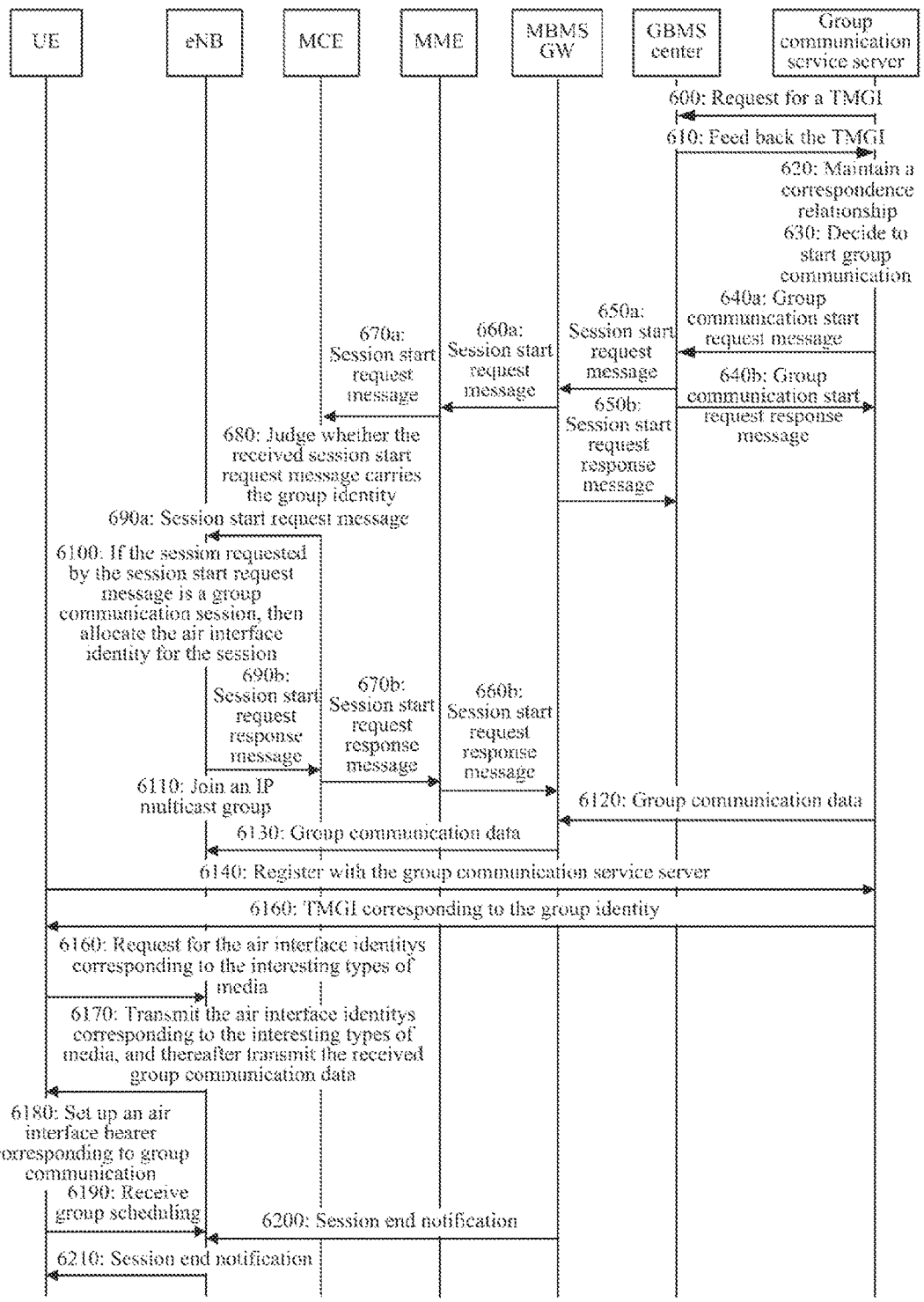
FIG. 6 is a fourth method signaling diagram according to an embodiment of the invention.

If types of media in the group are distinguished from each other (that is, each type of media in the group corresponds to a TMGI, then the UE receives the air interface via dedicated signaling. FIG. 6 illustrates a corresponding implementation of group communication.

The process flow illustrated in FIG. 6 is different from that illustrated in FIG. 3 primarily in the following operations:

In the step 6160, the UE requests the eNB via dedicated signaling for the air interface identity corresponding to the interesting type of media, where the dedicated signaling carries the TMGI corresponding to the interesting type of media. If the eNB can obtain the group identity in the step 690a, then the UE can alternatively transmit the dedicated signaling carrying a combination of the group identity and the TMGI.

In the step 6170, the eNB transmits the air interface identity corresponding to the interesting type of media to the UE via dedicated signaling, and thereafter can transmit the received group communication data to the UE.

Figure 7:
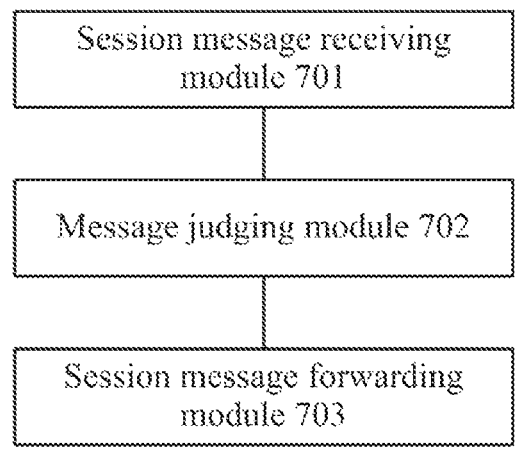
FIG. 7 is a schematic diagram of a first MBMS network device according to an embodiment of the invention.

Based upon the same inventive idea as the method, an embodiment of the invention further provides a multimedia broadcast multicast service network device, as illustrated in FIG. 7, which includes:

A session message receiving module 701 is configured to receive a session start request message transmitted by a mobility management device of an MBMS network;

A message judging module 702 is configured to judge whether the session start request message carries a group identity of a communication group to which a session requested by the session start request message relates; and A session message forwarding module 703 is configured to forward the session start request message to an access network device if the session start request message carries the group identity, so that the access network device allocates an air interface identity for the session requested by the session start request message for group communication.

The MBMS network device according to the embodiment of the invention forwards the received session start request message of the group communication session to the access network device instead of generating and transmitting the message to the access network device as in the existing MBMS process flow, so as to enable group communication in the MBMS network without changing the existing MBMS network architecture.

Preferably the session message forwarding module 703 is configured:

If the session start request message carries the group identity, to delete the group identity carried in the session start request message, and then forward the session start request message to the access network device.

Based upon the same inventive idea as the method, an embodiment of the invention further provides a multimedia broadcast multi cast service network device including a processor and a radio frequency component, where:

The processor is configured to receive a session start request message transmitted by a mobility management device of an MBMS network, through the radio frequency component; to judge whether the session start request message carries a group identity of a communication group to which a session requested by the session start request message relates; and if the session start request message carries the group identity, to forward the session start request message to an access network device through the radio frequency component so that the access network device allocates an air interface identity for the session requested by the session start request message for group communication.

The MBMS network device according to the embodiment of the invention forwards the received session start request message of the group communication session to the access network device instead of generating and transmitting the message to the access network device as in the existing MBMS process flow, so as to enable group communication in the MBMS network without changing the existing MBMS network architecture.

Figure 8:
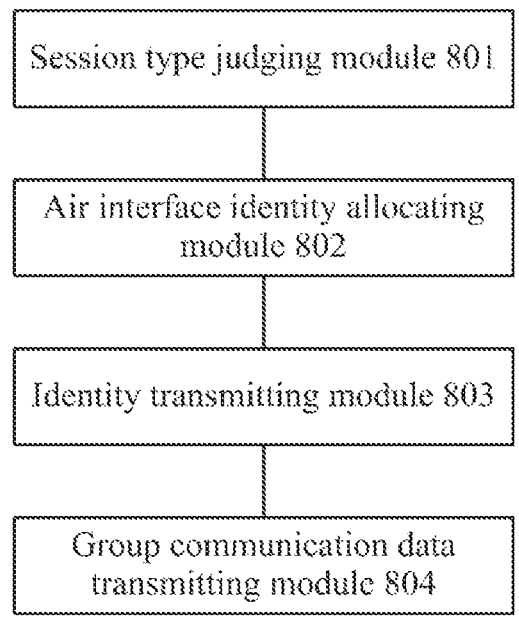
FIG. 8 is a schematic diagram of a first access network device according to an embodiment of the invention.

Based upon the same inventive idea as the method, an embodiment of the invention further provides an access network device, as illustrated in FIG. 8, which includes:

A session type judging module 801 is configured to judge for a session start request message transmitted by a Multimedia Broadcast Multicast Service (MBMS) network device whether a session requested by the session start request message is a group communication session or an MBMS session;

An air interface identity allocating module 802 is configured to allocate an air interface identity for the session if the session type judging module 801 judges that the session is a group communication session;

An identity transmitting module 803 is configured to transmit the air interface identity to a UE; and A group communication data transmitting module 804 is configured to transmit group communication data of the session, received from a group communication service server initiating the session, to the UE.

The access network device according to the embodiment of the invention will make judgment as to the type of the session requested by the session start request message transmitted by the MBMS network device, and if it is judged that the session is a group communication session, then the access network device allocates the corresponding air interface identity for the session, and further enable group communication in the MBMS network.

Preferably the session type judging module 801 is configured:

To search the session start request message for a group identity of a communication group to which the session relates; and If the session start request message carries the group identity, to judge that the session is a group communication session; otherwise, to judge that the session is an MBMS session; or The session type judging module 801 is configured:

To judge from the content of the session start request message whether the session requested by the session start request message is a group communication session or an MBMS session.

Further to any one of the embodiments of the access network device above, preferably the air interface identity includes at least a Group-Radio Network Temporary identity (G-RNTI), and a logic channel identity of an MBMS transmission channel.

Furthermore the logic channel identity of the MBMS transmission channel is the same as or different from a logic channel identity of a dedicated service channel allocated for the UE.

Further to any one of the embodiments of the access network device above, preferably the identity transmitting module 804 is configured:

TO broadcast an identity corresponding to a communication group to which the session relates, the air interface identity, and a correspondence relationship between the identity corresponding to the communication group and the air interface identity to the UE; or To receive a message transmitted by the UE to request for the air interface identity, where the message requesting for the air interface identity carries a temporary MBMS group identity; to search for the air interface identity corresponding to the temporary MBMS group identity; and to transmit the found air interface identity to the UE; or To receive a message transmitted by the UE to request for the air interface identity, where the message requesting for the air interface identity carries a temporary MBMS group identity; to search for the identity corresponding to the communication group corresponding to the temporary MBMS group identity, and the air interface identity corresponding to the temporary MBMS group identity; and to transmit the found identity corresponding to the communication group, the found air interface identity, and a correspondence relationship between the identity corresponding to the communication group and the air interface identity to the UE.

Based upon the same inventive idea as the method, an embodiment of the invention further provides another access network device including a processor and a radio frequency component, where:

The processor is configured to judge for a session start request message transmitted by a Multimedia Broadcast Multicast Service (MBMS) network device whether a session requested by the session start request message is a group communication session or an MBMS session; if it is judged that the session is a group communication session, to allocate an air interface identity for the session; to transmit the air interface identity to a UE; and to transmit group communication data of the session, received from a group communication service server initiating the session, to the UE through the radio frequency component.

The access network device according to the embodiment of the invention may make judgment as to the type of the session requested by the session start request message transmitted by the MBMS network device, and if it is judged that the session is a group communication session, then the access network device allocates the corresponding air interface identity for the session, and further enable group communication in the MBMS network.

Based upon the same inventive idea as the method, an embodiment of the invention further provides a group communication system including:

A mobility management device of an MBMS network, an MBMS network device, and an access network device, where:

The mobility management device of the MBMS network is configured to transmit a session start request message to the MBMS network device;

The MBMS network device is configured to judge whether the session start request message carries a group identity of a communication group to which a session requested by the session start request message relates; and if the session start request message carries the group identity, to forward the session start request message to the access network device; and The access network device is configured to judge for the session start request message transmitted by the MBMS network device whether the session requested by the session start request message is a group communication session or an MBMS session; if it is judged that the session is a group communication session, to allocate an air interface identity for the session; to transmit the air interface identity to the UE, and to transmit group communication data of the session, received from a group communication service server initiating the session, to the UE.

In the system according to the embodiment of the invention, if the session requested by the session start request message transmitted by the MBMS network side is a group communication session, then the corresponding session start request message will carry the group identity, and the MBMS network device according to the embodiment of the invention will forward the received session start request message to the access network device instead of generating and transmitting the message to the access network device as in the existing MBMS process flow; and the access network device will make judgment as to the type of the session requested by the session start request message transmitted by the MBMS network device, and if it is judged that the session is a group communication session, then the access network device will allocate the corresponding air interface identity for the session. Group communication can be enabled in the MBMS network without changing the existing MBMS network architecture.

Preferably the system according to the embodiment of the invention further includes a group communication service server, an MBMS service center node, and an MBMS gateway, where:

The group communication service server is configured to transmit a group communication start request message carrying the group identity to the MBMS service center node;

The MBMS service center node is configured to transmit the session start request message carrying the group identity to the MBMS gateway upon reception of the group communication start request message; and The MBMS gateway is configured to transmit the session start request message carrying the group identity to the mobility management device upon reception of the session start request message transmitted by the MBMS service center node.

Figure 9:
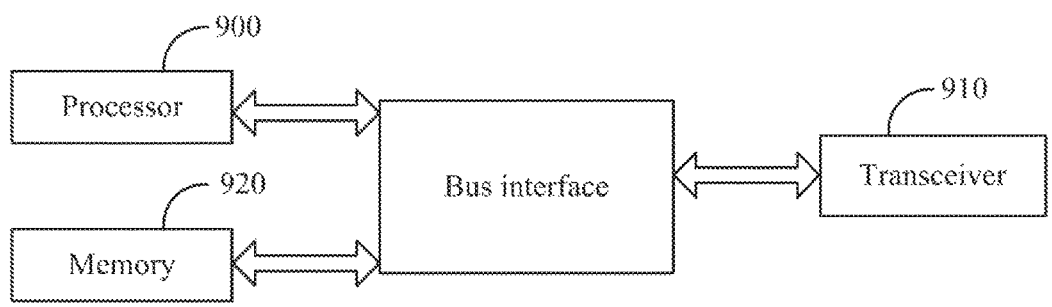
FIG. 9 is a schematic diagram of a second MBMS network device according to an embodiment of the invention.

As illustrated in FIG. 9, a second MBMS network device according to an embodiment of the invention includes:

A processor 900 is configured to receive a session start request message transmitted by a mobility management device of an MBMS network, through a transceiver 910; to judge whether the session start request message carries a group identity of a communication group to which a session requested by the session start request message relates; and if the session start request message carries the group identity, to forward the session start request message to an access network device through the radio frequency module through the transceiver 910 so that the access network device allocates an air interface identity for the session requested by the session start request message for group communication; and The transceiver 910 is configured to be controlled by the processor 900 to transmit and receive data The MBMS network device according to the embodiment of the invention forwards the received session start request message of the group communication session to the access network device instead of generating and transmitting the message to the access network device as in the existing MBMS process flow, so as to enable group communication in the MBMS network without changing the existing MBMS network architecture.

Preferably the processor 900 is configured:

If the session start request message carries the group identity, to delete the group identity carried in the session start request message, and then forward the session start request message to the access network device.

In FIG. 9, a bus architecture can include any number of interconnection buses and bridges which are particularly configured to link various circuits together including one or more processor represented by the processor 900, and a memory represented by a memory 920. The bus architecture can further link various other circuits together, e.g., peripheral devices, a manostat, a power management circuit, etc., all of which are well known in the art, so a repeated description thereof will be omitted in this context. A bus interface provides an interface. The transceiver 910 can include a plurality of elements including a transmitter and a receiver, configured to provide elements communicating with other various apparatuses over a transmission medium. The processor 900 is responsible for managing the bus architecture and typical processes, and the memory 920 can store data used by the processor 100 in performing operations.

The processor 900 is responsible for managing the bus architecture and typical processes, and the memory 920 can store data used by the processor 900 in performing operations.

Figure 10:
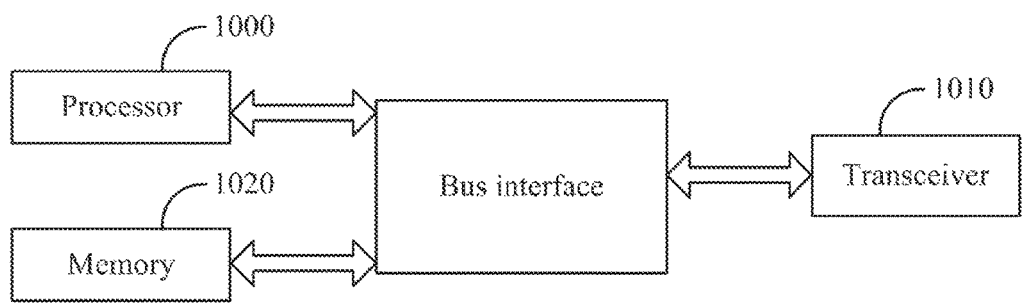
FIG. 10 is a schematic diagram of a second access network device according to an embodiment of the invention.

As illustrated in FIG. 10, a second access network device according to an embodiment of the invention includes:

A processor 1000 is configured to judge for a session start request message transmitted by an MBMS network device whether a session requested by the session start request message is a group communication session or an MBMS session; if it is judged that the session is a group communication session, to allocate an air interface identity; to transmit the air interface identity to a UE through a transceiver 1010; and to transmit group communication data of the session, received from a group communication service server initiating the session, to the UE through the radio frequency module through the transceiver 1010; and The transceiver 1010 is configured to be controlled by the processor 1000 to transmit and receive data The access network device according to the embodiment of the invention will make judgment as to the type of the session requested by the session start request message transmitted by the MBMS network device, and if it is judged that the session is a group communication session, then the access network device will allocate the corresponding air interface identity for the session, and further enable group communication in the MBMS network.

Preferably the processor 1000 is configured:

To search the session start request message for a group identity of a communication group to which the session relates; and If the session start request message carries the group identity, to judge that the session is a group communication session; otherwise, to judge that the session is an MBMS session; or To judge from the contents of the session start request message whether the session requested by the session start request message is a group communication session or an MBMS session.

Further to any one of the embodiments of the access network device above, preferably the air interface identity includes at least a Group-Radio Network Temporary Identity (G-RNTI), and a logic channel identity of an MBMS transmission channel.

Furthermore the logic channel identity of the MBMS transmission channel is the same as or different from a logic channel identity of a dedicated service channel allocated for the UE.

Further to any one of the embodiments of the access network device above, preferably the processor 1000 is configured:

To broadcast an identity corresponding to a communication group to which the session relates, the air interface identity, and a correspondence relationship between the identity corresponding to the communication group, and the air interface identity to the UE through the transceiver 1010; or To receive a message transmitted by the UE to request for the air interface identity through the transceiver 1010, where the message requesting for the air interface identity carries a temporary MBMS group identity; to search for the air interface identity corresponding to the temporary MBMS group identity; and to transmit the found air interface identity to the UE through the transceiver 1010; or To receive a message transmitted by the UE to request for the air interface identity through the transceiver 1010, where the message requesting for the air interface identity carries a temporary MBMS group identity; to search for the identity corresponding to the communication group corresponding to the temporary MBMS group identity, and the air interface identity corresponding to the temporary MBMS group identity; and to transmit the found identity corresponding to the communication group, the found air interface identity, and a correspondence relationship between the identity corresponding to the communication group, and the air interface identity to the UE through the transceiver 1010.

Here in FIG. 10, a bus architecture can include any number of interconnection buses and bridges which are particularly configured to link various circuits together including one or more processor represented by the processor 1000, and a memory represented by a memory 1020. The bus architecture can further link various other circuits together, e.g., peripheral devices, a manostat, a power management circuit, etc., all of which are well known in the art, so a repeated description thereof will be omitted in this context. A bus interface provides an interface. The transceiver 1010 can include a plurality of elements including a transmitter and a receiver configured to provide elements communicating with other various apparatuses over a transmission medium. The processor 1000 is responsible for managing the bus architecture and typical processes, and the memory 1020 can store data used by the processor 1000 in performing operations.

The processor 1000 is responsible for managing the bus architecture and typical processes, and the memory 1020 can store data used by the processor 1000 in performing operations.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including hut not limited to a disk memory, a CD-ROM, an optical memory, etc.) in which computer useable program codes are contained.

The invention has been described in a flow chart and/or a block diagram of the method, the device system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coining into the scope of the invention.

Evidently those skilled in the art can make various modifications and variations to the invention without departing from the spirit and scope of the invention Thus the invention is also intended to encompass these modifications and variations thereto an long as the modifications and variations come into the scope of the claims appended to the invention and their equivalents.

The invention claimed is:

1. A group communication method, the method comprising:
receiving a session start request message transmitted by a mobility management device in a Multimedia Broadcast Multicast Service (MBMS) network;
judging whether the session start request message carries a group identity of a communication group to which a session requested by the session start request message relates, wherein the group identity is configured to identify a group communication, which is performed through group scheduling over an air interface based on a Group-Radio Network Temporary Identity (G-RNTI); and
if the session start request message carries the group identity, forwarding the session start request message to an access network device so that the access network device allocates an air interface identity for the session requested by the session start request message for group communication.

2. The method according to claim 1, wherein forwarding the session start request message to the access network device comprises:
deleting the group identity carried in the session start request message, and forwarding the session start request message to the access network device.

3. The method according to claim 1, wherein the method further comprises:
receiving, by an MBMS service center node, a group communication start request message transmitted by a group communication service server, wherein the group communication start request message carries the group identity;
transmitting, by the MBMS service center node, the session start request message carrying the group identity to an MBMS gateway; and
transmitting, by the MBMS gateway, the session start request message carrying the group identity to the mobility management device.

4. A group communication method, comprising:
judging, by an access network device, for a session start request message transmitted from a Multimedia Broadcast Multicast Service (MBMS) network device whether a session requested by the session start request message is a group communication session or an MBMS session;
if it is judged that the session is a group communication session, then allocating, by the access network device, an air interface identity for the session for group communication, wherein the group communication is performed through group scheduling over an air interface based on a Group-Radio Network Temporary Identity (G-RNTI);
transmitting, by the access network device, the air interface identity to a UE; and
transmitting, by the access network device, group communication data of the session, received from a group communication service server initiating the session, to the UE.

5. The method according to claim 4, wherein judging for the session start request message transmitted from the MBMS network device whether the session requested by the session start request message is a group communication session or an MBMS session comprises:
searching the session start request message for a group identity of a communication group to which the session relates; and if the session start request message carries the group identity, then judging that the session is a group communication session; otherwise, judging that the session is an MBMS session;
or
judging from the content of the session start request message whether the session requested by the session start request message is a group communication session or an MBMS session.

6. The method according to claim 4, wherein the air interface identity comprises at least the G-RNTI, and a logic channel identity of an MBMS transmission channel; and
the logic channel identity of the MBMS transmission channel is the same as or different from a logic channel identity of a dedicated service channel allocated for the UE.

7. The method according to claim 4, wherein transmitting the air interface identity to the UE comprises:
broadcasting the air interface identity, an identity corresponding to a communication group to which the session relates, and a correspondence relationship between the identity corresponding to the communication group and the air interface identity to the UE; or
receiving a message transmitted from the UE to request for the air interface identity, wherein the message requesting for the air interface identity carries a temporary MBMS group identity; searching for the air interface identity corresponding to the temporary MBMS group identity; and transmitting the found air interface identity to the UE; or
receiving a message transmitted from the UE to request for the air interface identity, wherein the message requesting for the air interface identity carries a temporary MBMS group identity; searching for the identity corresponding to the communication group corresponding to the temporary MBMS group identity, and the air interface identity corresponding to the temporary MBMS group identity; and transmitting the found identity corresponding to the communication group, the found air interface identity, and a correspondence relationship between the identity corresponding to the communication group and the air interface identity to the UE.

8. A multimedia broadcast multicast service network device, comprising:
a processor;
a transceiver configured to be controlled by the processor to transmit and receive data; and
a memory storing at least one instruction, wherein the processor is configured to read the at least one instruction to:
control the transceiver to receive a session start request message transmitted by a mobility management device in an MBMS network;
judge whether the session start request message carries a group identity of a communication group to which a session requested by the session start request message relates, wherein the group identity is configured to identify a group communication, which is performed through group scheduling over an air interface based on a Group-Radio Network Temporary Identity (G-RNTI); and
control the transceiver to forward the session start request message to an access network device if the session start request message carries the group identity, so that the access network device allocates an air interface identity for the session requested by the session start request message for group communication.

9. The multimedia broadcast multicast service network device according to claim 8, wherein the processor is further configured to read the at least one instruction to:
- if the session start request message carries the group identity, delete the group identity carried in the session start request message, and then control the transceiver to forward the session start request message to the access network device.

10. An access network device, comprising:
- a processor;
- a transceiver configured to be controlled by the processor to transmit and receive data; and
- a memory storing at least one instruction, wherein the processor is configured to read the at least one instruction to:
- judge for a session start request message transmitted by an MBMS network device whether a session requested by the session start request message is a group communication session or an MBMS session;
- allocate an air interface identity for the session for group communication, if the processor judges that the session is a group communication session, wherein the group communication is performed through group scheduling over an air interface based on a Group-Radio Network Temporary Identity (G-RNTI);
- control the transceiver to transmit the air interface identity to a UE; and
- control the transceiver to transmit group communication data of the session, received from a group communication service server initiating the session, to the UE.

11. The access network device according to claim 10, wherein the processor is further configured to read the at least one instruction to:
- search the session start request message for a group identity of a communication group to which the session relates; and if the session start request message carries the group identity, judge that the session is a group communication session; otherwise, judge that the session is an MBMS session; or
- judge from the content of the session start request message whether the session requested by the session start request message is a group communication session or an MBMS session.

12. The access network device according to claim 10, wherein the air interface identity comprises at least the G-RNTI, and a logic channel identity of an MBMS transmission channel; and
- the logic channel identity of the MBMS transmission channel is the same as or different from a logic channel identity of a dedicated service channel allocated for the UE.

13. The access network device according to claim 10, wherein the processor is further configured to read the at least one instruction to:
- control the transceiver to broadcast an identity corresponding to a communication group to which the session relates, the air interface identity, and a correspondence relationship between the identity corresponding to the communication group and the air interface identity to the UE; or
- control the transceiver to receive a message transmitted by the UE to request for the air interface identity, wherein the message requesting for the air interface identity carries a temporary MBMS group identity; to search for the air interface identity corresponding to the temporary MBMS group identity; and to transmit the found air interface identity to the UE; or
- control the transceiver to receive a message transmitted by the UE to request for the air interface identity, wherein the message requesting for the air interface identity carries a temporary MBMS group identity; to search for the identity corresponding to the communication group corresponding to the temporary MBMS group identity, and the air interface identity corresponding to the temporary MBMS group identity; and to transmit the found identity corresponding to the communication group, the found air interface identity, and a correspondence relationship between the identity corresponding to the communication group and the air interface identity to the UE.

14. The method according to claim 2, wherein the method further comprises:
- receiving, by an MBMS service center node, a group communication start request message transmitted by a group communication service server, wherein the group communication start request message carries the group identity;
- transmitting, by the MBMS service center node, the session start request message carrying the group identity to an MBMS gateway; and
- transmitting, by the MBMS gateway, the session start request message carrying the group identity to the mobility management device.

15. The method according to claim 5, wherein the air interface identity comprises at least the G-RNTI, and a logic channel identity of an MBMS transmission channel; and
- the logic channel identity of the MBMS transmission channel is the same as or different from a logic channel identity of a dedicated service channel allocated for the UE.

16. The method according to claim 5, wherein transmitting the air interface identity to the UE comprises:
- broadcasting the air interface identity, an identity corresponding to a communication group to which the session relates, and a correspondence relationship between the identity corresponding to the communication group and the air interface identity to the UE; or
- receiving a message transmitted from the UE to request for the air interface identity, wherein the message requesting for the air interface identity carries a temporary MBMS group identity; searching for the air interface identity corresponding to the temporary MBMS group identity; and transmitting the found air interface identity to the UE; or
- receiving a message transmitted from the UE to request for the air interface identity, wherein the message requesting for the air interface identity carries a temporary MBMS group identity; searching for the identity corresponding to the communication group corresponding to the temporary MBMS group identity, and the air interface identity corresponding to the temporary MBMS group identity; and transmitting the found identity corresponding to the communication group, the found air interface identity, and a correspondence relationship between the identity corresponding to the communication group and the air interface identity to the UE.

17. The access network device according to claim 11, wherein the air interface identity comprises at least the G-RNTI, and a logic channel identity of an MBMS transmission channel; and the logic channel identity of the MBMS transmission channel is the same as or different from a logic channel identity of a dedicated service channel allocated for the UE.

18. The access network device according to claim 11, wherein the processor is further configured to read the at least one instruction to:

control the transceiver to broadcast an identity corresponding to a communication group to which the session relates, the air interface identity, and a correspondence relationship between the identity corresponding to the communication group and the air interface identity to the UE; or control the transceiver to receive a message transmitted by the UE to request for the air interface identity, wherein the message requesting for the air interface identity carries a temporary MBMS group identity; to search for the air interface identity corresponding to the temporary MBMS group identity; and to transmit the found air interface identity to the UE; or control the transceiver to receive a message transmitted by the UE to request for the air interface identity, wherein the message requesting for the air interface identity carries a temporary MBMS group identity; to search for the identity corresponding to the communication group corresponding to the temporary MBMS group identity, and the air interface identity corresponding to the temporary MBMS group identity; and to transmit the found identity corresponding to the communication group, the found air interface identity, and a correspondence relationship between the identity corresponding to the communication group and the air interface identity to the UE.

* * * * *